United States Patent
Shah

[11] 4,010,444
[45] Mar. 1, 1977

[54] AUTOMOTIVE BURGLAR ALARM WITH GAS SIPHONING DETECTOR

[76] Inventor: Aroon C. Shah, 15 Spruce St., Waltham, Mass. 02154

[22] Filed: Mar. 29, 1976

[21] Appl. No.: 671,320

[52] U.S. Cl. .................................. 340/63; 340/59; 340/244 R; 307/10 AT; 180/114
[51] Int. Cl.² ........................................ B60R 25/10
[58] Field of Search ............ 340/63, 65, 59, 213 R, 340/214, 244 R, 244 A, 244 B, 244 D, 248 A; 307/10 R, 10 AT; 180/114

[56] References Cited
UNITED STATES PATENTS

| | | | |
|---|---|---|---|
| 3,925,756 | 12/1975 | Edwards | 340/59 |
| 3,939,471 | 2/1976 | Momberg | 340/59 |

*Primary Examiner*—Alvin H. Waring
*Attorney, Agent, or Firm*—Jack D. Slobod

[57] ABSTRACT

An automotive burglar alarm system receives an input from a gasoline float responsive potentiometer. The potentiometer is included in a voltage divider with a manually adjustable resistor. The divider has one output signal connected, without inversion, to one input of a window comparator formed by a pair of PUT's. The other comparator input terminal is fed via an inverter from another output of the voltage divider thus forming a bridge circuit with the window comparator as an unbalance defector. The output of the window comparator operates an SCR coupled, via a selector switch, for controlling the energization of either a test light or the horn of the automotive vehicle. The manually adjustable potentiometer is initially calibrated using the test light, to bring the comparator input signals into substantial equality. Then the horn is selected for energization to signal any change in the resistance of the float potentiometer.

2 Claims, 1 Drawing Figure

AUTOMOTIVE BURGLAR ALARM WITH GAS SIPHONING DETECTOR

FIELD OF THE INVENTION

The present invention relates generally to automotive burglar alarms having means for setting off an alarm in response to an attempt to siphon gasoline from the vehicle. In its particular aspects, the present invention relates to a burglar alarm responsive to a change in resistance of the gasoline float controlled potentiometer of the vehicle.

BACKGROUND OF THE INVENTION

While in the prior art, various burglar alarm devices have been proposed for preventing the theft of gasoline from the fuel tank of an automotive vehicle, such devices required an additional switch to be installed proximate the gasoline cap such as for detecting the removal of the cap or the movement of a cover thereover. Illustrative are U.S. Pat. Nos. 3,873,966 and 3,878,507.

Float controlled potentiometers are utilized in the fuel tanks of most automotive vehicles to form a gas guage in conjunction with a dashboard mounted meter movement. The resistance of the float potentiometer increases with increasing fuel level in vehicles made by some manufacturers and decreases with increasing fuel level in vehicles made by other manufacturers.

OBJECTS OF THE INVENTION

It is an object of the present invention to provide a burglar alarm system utilizing the usual float responsive potentiometer in the fuel tank as a sensor to prevent theft of fuel.

It is yet another object of the present invention to provide an automotive burglar alarm having variable means settable for correspondence with a level of resistance of the fuel tank float potentiometer and circuit means for sounding an alarm in response to either an increase or decrease in the float potentiometer from that level in order to accommodate vehicles having different manufacturers.

SUMMARY OF THE INVENTION

Briefly, the aforementioned and other objects of the present invention are satisfied by providing a manually adjustable resistor in a balanceable bridge circuit with the usual fuel tank float controlled variable resistor or potentiometer.

The manually adjustable resistor is set to a point for balancing the bridge circuit. Thus, any later unbalance of the bridge may be attributed to an attempted siphoning of fuel from the tank. This unbalance is detected by a type of window comparator fed by two outputs of the bridge for detecting an unbalance in either direction by more than a predetermined amount.

The comparator feeds an electrically controlled switch means located in series with the auto battery and a selector switch for operatively selecting either and audible alarm or a test light. The test light is utilized during balancing of the bridge circuit. Thereafter, the alarm is selected for signalling any subsequent unbalance of the bridge circuit.

The bridge circuit is formed by a voltage divider means including both variable resistors. One input of the window comparator is fed from one output of the voltage divider means without inversion and the other input of the window comparator is fed from another output of the voltage divider means via an inverting amplifier means.

The window comparator operates to change its state when the absolute value of the difference between voltages on its input terminals exceeds a predetermined amount. The bridge circuit is initially balanced, prior to arming the alarm system, to bring these voltages to substantial equality.

Other objects, features and advantages of the present invention will become apparent upon perusal of the following detailed description of the preferred embodiment thereof when taken in conjunction with the appended drawing wherein:

FIG. 1 is a schematic drawing of the automotive burglar alarm system of the present invention.

DETAILED DESCRIPTION

Figure 1:
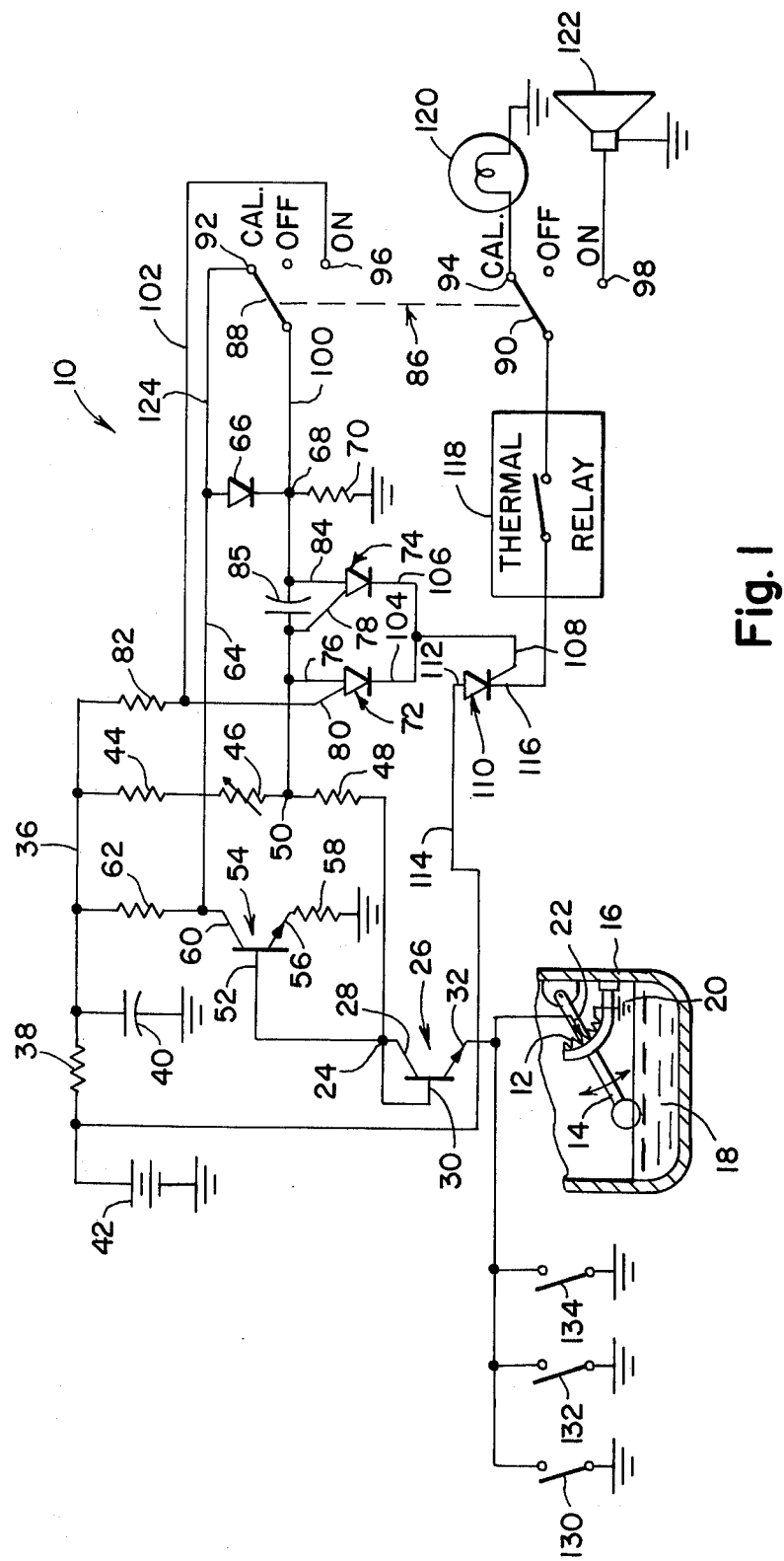

Referring to FIG. 1 of the drawing, the automotive burglar alarm system 10 of the present invention utilizes the usual potentiometer 12 cooperating with a pivotted float 14 within the fuel tank 16 of an automotive vehicle to detect an attempt to siphon fuel 18 therefrom. One end of potentiometer 12 is grounded at 20, and a wiper 22 is carried by float 14 for positioning along the potentiometer in relation to the level of fuel 18 in tank 16. Potentiometer 12 is illustrated of the type whose resistance between wiper 22 and the grounded end 20 increases as the fuel level increases, as is the case in automobiles made by most manufacturers. In some vehicles, the aforementioned resistance will decrease with increasing fuel level, however, the system 10 will operate in either event as will be apparent as the discussion proceeds.

The wiper 22 is connected to a node 24 via a circuit protection diode 26 formed by an NPN transistor whose collector 28 and base 30 are each connected to node 24 and whose emitter 32 is connected to wiper 22. A filtered power supply line 36 is provided at the output of a low pass transient spike suppression filter formed of resistor 38 and capacitor 40 fed by the auto battery 42. A fixed resistor 44, a manually variable resistor 46 and a fixed resistor 48 are provided in a series path connected at one end of resistor 44 to supply lead 36 and at one end of resistor 48 to mode 24. Consequently, the resistors 44, 46, 48 and the potentiometer 12 form a voltage divider that charges capacitor 40. Node 24 is used as one output terminal of this voltage divider and a node 50 is used as another output.

The node 24 is connected to the base 52 of an NPN transistor 54. The emitter 56 of transistor 54 is coupled to ground via a resistor 58 and the collector 60 of the transistor is coupled to power supply line 36 via a load resistor 62. Consequently, transistor 54 forms an inverting amplifier in conjunction with resistors 58 and 62 having an output at collector 60 in response to the voltage divider output at node 24. The collector 60 is coupled via a lead 64 and a diode 66 to a node 68 which is in turn coupled to ground via a resistor 70.

The circuitry of system 10 feeding the nodes 50 and 68 comprises a bridge circuit balanceable by bringing the voltages on these nodes into substantial equality through adjustment of resistor 46. Then, if the fuel level in tank 16 changes, thereby changing the resistance of potentiometer 12 between wiper 22 and ground, this bridge will become unbalanced.

A detector for unbalance of this bridge is formed by a pair of PUT devices 72 and 74. The anode 76 of PUT 72 and the gate 78 of PUT 74 are connected in common to node 50. The gate 80 of PUT 72 is connected to supply line 36 via a resistor 82 and the anode 84 of PUT 74 is connected to node 68. Further, the gate 78 and anode 84 of PUT 74 are coupled together via a capacitor 85 to prevent noise responsive triggering of PUT 74.

A double-pole triple-throw selector switch 86 is provided having a center off position. Switch 86 includes two wipers 88 and 90 which respectively engage contacts 92 and 94 when the system 10 is to be calibrated and which respectively engage contacts 96 and 98 when system 10 is turned on or armed. Wiper 88 is connected to node 68 by lead 100 and contact 96 is connected to gate 80 via lead 102. Thus when system 10 is armed, gate 80 of PUT 72 and anode 84 of PUT 74 are both connected to node 68. Thus, in view of the nature of PUT devices, if the voltage on node 68 is greater than the voltage on node 50 by more than a predetermined amount on the order of 0.7 volts, PUT 74 will be turned on, and if the voltage on node 50 is greater than the voltage at node 68 by the same predetermined amount, PUT 72 will be turned on. The respective cathodes 104 and 106 of PUT devices 72 and 74 are connected in common to the gate 108 of an SCR 110. The anode 112 of SCR 110 is connected to the positive side of battery 42 via lead 114. Thus, in response to either of PUT devices 72 or 74 being turned on, gate 108 will be energized to turn on SCR 110 creating a positive voltage at the cathode 116 of the SCR.

It should thus be apparent that the PUT devices 72 and 74 together for a window comparator to create a positive voltage at the cathode 116 of SCR 110 when the absolute value of the difference between the voltages on nodes 50 and 68 exceeds a predetermined amount. Further, it should be apparent that this window comparator will be responsive whether the resistance between the resistance between the float potentiometer wiper 22 and ground increases or decreases since in either case an unbalance is caused.

The cathode 116 of SCR 110 is connected to wiper 90 via a normally closed thermal relay 118 of the type for opening in response to heat caused by current passing therethrough and reclosing upon cooling to produce a periodic current flow therethrough. Contact 94 is connected to one side of a test lamp 120 whose other end is grounded while contact 98 is connected to an electrically energizeable sonic alarm such as the automotive horn 122. Thus, in response to SCR 110 being turned on, when switch 86 is set for calibration, lamp 120 is lit, while when switch 86 is set for aiming system 10, the horn 122 is energized.

To calibrate the system 10, the variable resistor 46 is adjusted while switch 86 is in its calibrate position. The switch contact 92 is connected to the anode of diode 66 by lead 124 in a manner that diode 66 is shorted. Further, gate 80 of PUT 72 is disconnected from node 68 and is therefore held near the potential of supply line 36 by the coupling thereto via resistor 82. Consequently, PUT 72 is biased off. The resistance of resistor 46 is varied just to the point where lamp 120 begins to light in view of PUT 74 being turned on. At that point, the voltage on node 68 exceeds the voltage on node 50 by about 0.7 volts.

Then, when switch is thrown to the on position, for arming the alarm system 10, the short is removed from across diode 66 which then introduces an additional voltage drop, on the order of 0.7 volt to reduce the voltage at node 68 to bring it into substantial equality with the voltage on node 50.

For utilizing the alarm system 10 to also respond to the opening of the doors, hood, or trunk of the automotive vehicle, normally open microswitches 130–134 sensing these elements being opened are connected in parallel between ground and wiper 22.

While the preferred embodiment of the present invention has been described in specific detail, it should be understood that numerous modifications, additions and omissions in the details thereof are possible within the intended spirit and scope of the invention claimed herein.

What is claimed is:

1. A security alarm apparatus for warning of attempted siphoning of gasoline in an automotive vehicle having a battery, an electrically energizeable sonic alarm, and a first variable resistor whose resistance is varied by a gas tank float, said apparatus comprising: a window comparator means having first and second input terminals and an output terminal, a resistive voltage divider means including said first resistor and a second manually adjustable resistor; means for connecting said voltage divider means across said battery; said voltage divider means having output signal means coupled without inversion to the first terminal of said window comparator means to form a first signal at said first input terminal, an inverting amplifier means fed by said output signal means of said voltage divider means and feeding the second input terminal of said window comparator means to form a second signal at said second input terminal; said second resistor being variable to initially set said alarm apparatus in a manner that said first and second signals are substantially equal, said window comparator means being configured in a manner that said output terminal has a predetermined output signal state in response to the absolute value of the difference between said first and second signals being greater than a predetermined constant, and means responsive to the output of said window comparator means for coupling said sonic alarm across said battery in response to said predetermined state.

2. The apparatus of claim 1 further comprising a test lamp, said comparator output responsive coupling means including selector switch means for operatively selecting either said sonic alarm or said test lamp for coupling across said battery in response to said predetermined state, whereby said manually adjustable potentiometer may be adjusted while said test lamp is selected.

* * * * *